(12) United States Patent
    Boulton

(10) Patent No.: US 10,936,726 B2
(45) Date of Patent: Mar. 2, 2021

(54) DETERMINING SECURITY RISKS IN SOFTWARE CODE

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 171 days.

(21) Appl. No.: 16/200,409

(22) Filed: Nov. 26, 2018

(65) Prior Publication Data

US 2020/0167476 A1    May 28, 2020

(51) Int. Cl.
    *G06F 21/56*    (2013.01)
    *G06F 21/57*    (2013.01)

(52) U.S. Cl.
    CPC .......... *G06F 21/577* (2013.01); *G06F 21/563* (2013.01); *G06F 2221/033* (2013.01)

(58) Field of Classification Search
    CPC .......... G06F 21/50; G06F 21/51; G06F 21/55; G06F 21/56; G06F 21/562; G06F 21/577; G06F 21/563; G06F 2221/033
    See application file for complete search history.

(56) References Cited

U.S. PATENT DOCUMENTS

| | | | | |
|---|---|---|---|---|
| 7,603,712 | B2 * | 10/2009 | Seinfeld | G06F 21/56 726/24 |
| 9,336,381 | B1 * | 5/2016 | Kane-Parry | G06F 21/577 |
| 9,465,942 | B1 * | 10/2016 | Kane-Parry | G06F 21/57 |
| 9,733,903 | B2 * | 8/2017 | Bates | G06F 8/73 |
| 10,484,429 | B1 * | 11/2019 | Fawcett | H04L 63/20 |
| 2004/0025009 | A1 * | 2/2004 | Camber | G06F 8/52 713/152 |
| 2014/0173737 | A1 * | 6/2014 | Toback | G06F 21/57 726/25 |
| 2015/0143328 | A1 * | 5/2015 | Cope | G06Q 10/103 717/102 |
| 2016/0132327 | A1 * | 5/2016 | Tehrani | G06F 8/20 717/105 |
| 2017/0147338 | A1 * | 5/2017 | Jackson | G06F 11/36 |
| 2017/0169229 | A1 * | 6/2017 | Brucker | G06F 21/566 |
| 2018/0129812 | A1 * | 5/2018 | Kang | G06F 21/566 |
| 2018/0246738 | A1 * | 8/2018 | McCourtney | G06F 9/45512 |
| 2019/0005206 | A1 * | 1/2019 | Sahoo | G06F 8/75 |
| 2019/0087550 | A1 * | 3/2019 | Kim | G06F 16/148 |
| 2020/0057858 | A1 * | 2/2020 | Sharma | G06F 21/577 |

* cited by examiner

*Primary Examiner* — Malcolm Cribbs
(74) *Attorney, Agent, or Firm* — Fish & Richardson P.C.

(57) ABSTRACT

Systems, methods, and software can be used to analyze OSS components of a software code. In some aspects, a computer-implemented method comprises: scanning, by at least one hardware processor, a software code to determine whether the software code includes an open source software (OSS) component; for each OSS component included in the software code: determining, by the at least one hardware processor, a security score for the OSS component; and determining, by the at least one hardware processor, whether the OSS component meets a security policy by comparing the security score with a threshold; and in response to determining that at least one OSS component does not meet the security policy, preventing, by the at least one hardware processor, the software code including the at least one OSS component from being compiled.

20 Claims, 2 Drawing Sheets

DETERMINING SECURITY RISKS IN SOFTWARE CODE

TECHNICAL FIELD

The present disclosure relates to determining security risks in software code.

BACKGROUND

Open source software (OSS) refers to a type of computer software whose source code is released under a license in which the copyright holder grants users the rights to study, change, and distribute the software. OSS may be developed in a collaborative public manner. OSS is developed by different OSS organizations, sometimes referred to as OSS projects. In some cases, software developers can include OSS components in the software that they develop.

DESCRIPTION OF DRAWINGS

Like reference numbers and designations in the various drawings indicate like elements.

DETAILED DESCRIPTION

In some cases, a software developer can submit software code to a software service platform that is operated by a software provider. The software code can be executed on the software service platform to provide software services to user devices. Alternatively or additionally, the software code can be downloaded to user devices. The software service platform can be implemented in one or more servers, or on a cloud-computing platform.

In some implementations, the software service platform can inspect the software code for security risks. Security risks can include malicious software code that would harm user devices, expose user information, or a combination thereof. Security risks can also include code that is vulnerable to malicious attacks.

Figure 1:
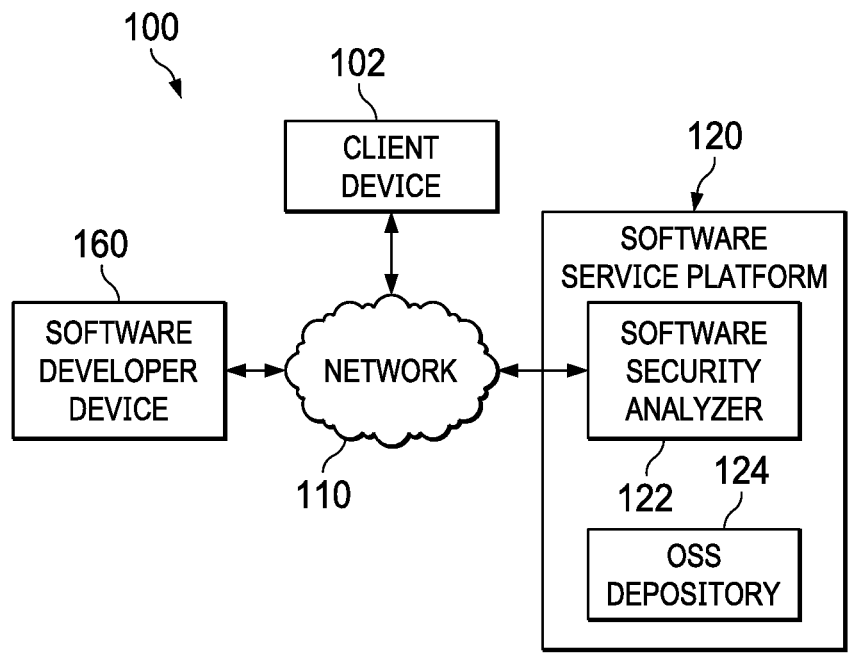
FIG. 1 is a schematic diagram showing an example communication system that analyzes OSS components of a software code, according to an implementation.
Figure 2:
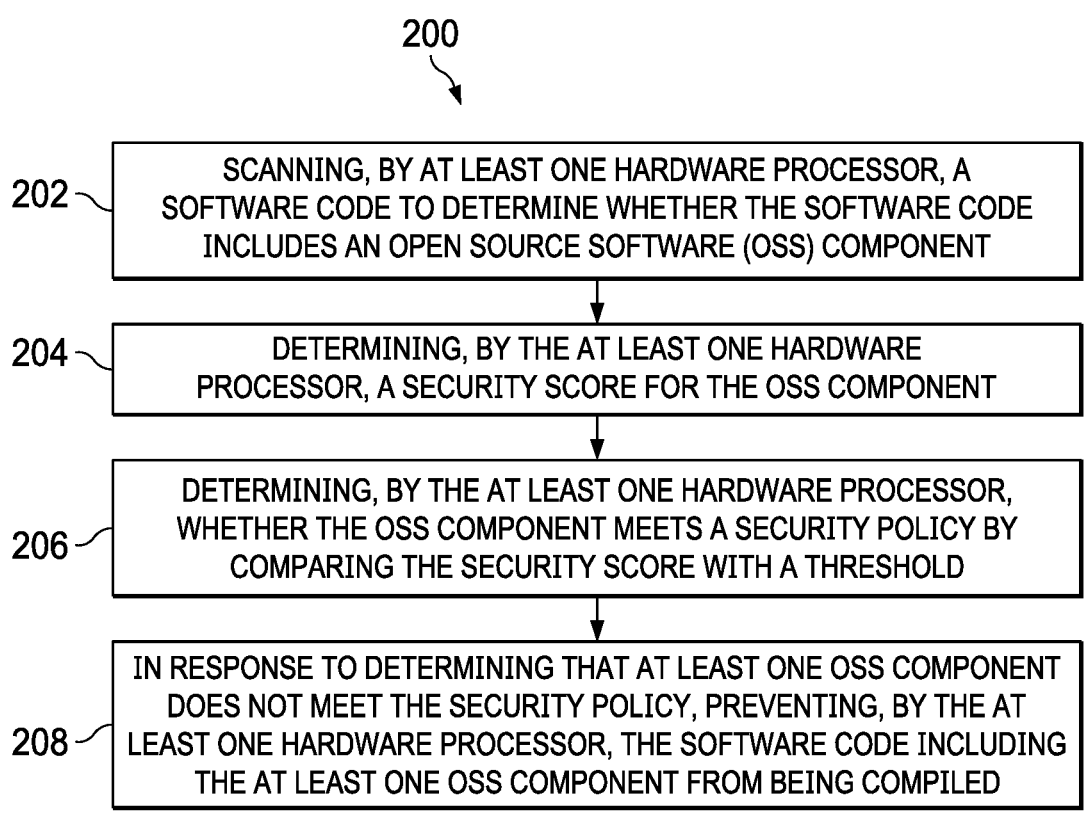
FIG. 2 is a flow diagram showing an example method that analyzes OSS components of a software code, according to an implementation.
Figure 3:
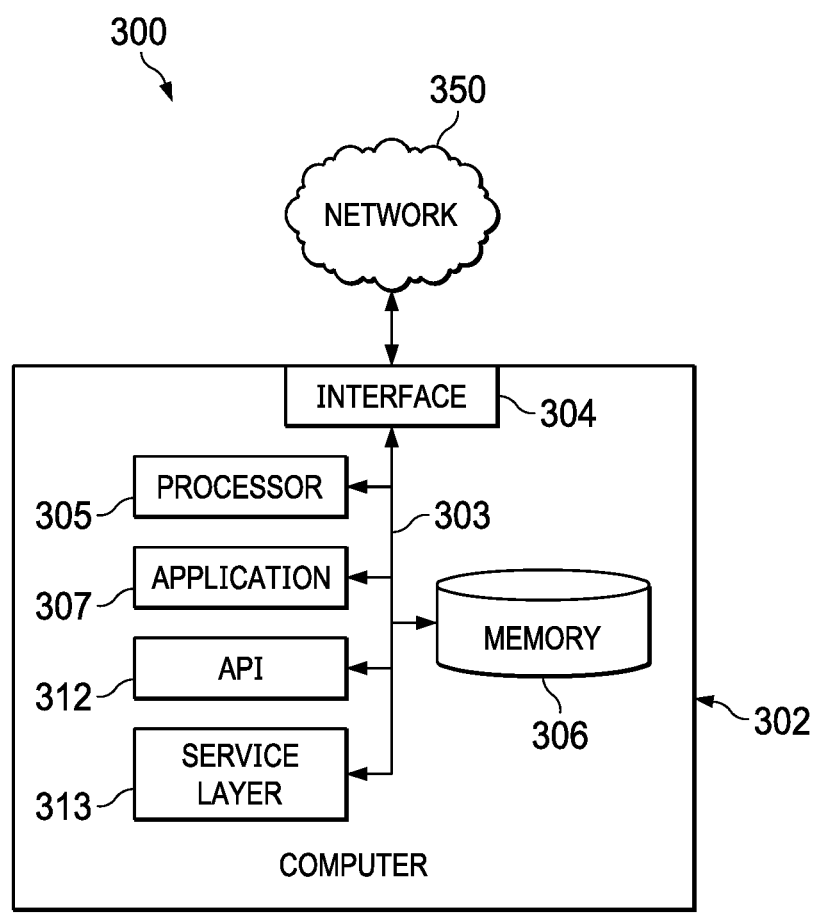
FIG. 3 is a high-level architecture block diagram of a computing system, according to an implementation.

In some cases, the security risks of a software code can be determined based on the OSS components included in the software code. Different OSS components can be developed under different OSS projects, which may maintain different levels of security quality for their software. Furthermore, as the public interests in an OSS project change, the level of commitments from public developers would also change. As a result, the security quality of the software code developed by the OSS project will change accordingly. By performing a quantitative assessment of the security quality of the OSS components included in the software code, the software service platform can evaluate the security risks of the software code. In some cases, the software service platform can prevent the software code that has significant security risks from being compiled, and thus prevent the software code from being available to public. In addition, the software service platform can suggest possible replacements for the OSS component that has low security quality. FIGS. 1-3 and associated descriptions provide additional details of these implementations.

FIG. 1 is a schematic diagram showing an example communication system 100 that analyzes OSS components of a software code, according to an implementation. At a high level, the example communication system 100 includes a client device 102, a software developer device 160, and a software service platform 120 that are communicatively coupled with a network 110.

The software developer device 160 represents an application, a set of applications, software, software modules, hardware, or any combination thereof that can be configured to submit software code to the software service platform 120. The software code can be downloaded to the client device 102 to be exacted on the client device 102. The software code can also be executed on the software service platform 120 to provide software service to the client device 102. Examples of the software services can include software as a service (SaaS) applications such as SALESFORCE, OFFICE 365, or other software application services.

The software service platform 120 includes a software security analyzer 122 and an OSS depository 124. The software security analyzer 122 represents an application, a set of applications, software, software modules, hardware, or any combination thereof that can be configured to analyze software code for security risks. In some implementations, the software security analyzer 122 can identify one or more OSS components in the software code. For each OSS component, the software security analyzer 122 can determine a secure score and determine whether the OSS component meets a security policy by comparing the secure score with a configured threshold. If at least one OSS component does not meet the security policy, the software service platform can prevent the software code from being compiled. In some cases, the software security analyzer 122 can obtain a replacement OSS component for the OSS component that fails to meet the security policy, and suggest the replacement OSS component to the software developer device 160 or replace the OSS component that fails to meet the security policy with the replacement OSS component. FIGS. 2-3 and associated descriptions provide additional details of these implementations.

The OSS depository 124 represents an application, a set of applications, software, software modules, hardware, or any combination thereof that can be configured to store OSS components that can be used by software code submitted by the software developer device 160. In some cases, the OSS depository 124 can store the code content of the OSS components. Alternatively or additionally, the OSS depository 124 can store links to servers hosting the OSS components that can be used to invoke the OSS components. In some implementations, the OSS depository 124 also includes information of the OSS components that can be used to calculate security score of the OSS components. FIGS. 2-3 and associated descriptions provide additional details of these implementations.

The software service platform 120 can be implemented using one or more computers, computer servers, or a cloud-computing platform.

The client device 102 represents an electronic device that accesses a software service provided by the software provider. In some cases, a browser or a client application can be executed on the client device 102 to communicate service requests and service responses with the software service platform 120 to obtain software services.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or combination thereof that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example method 200 that analyzes OSS components of a software code, according to an implementation. The method 200 can be implemented by a software service platform, e.g., the software service platform 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a software code is scanned to determine whether the software code includes one or more OSS components. In some implementations, the software code can be submitted to a software service platform by a software developer, over a network. The software code can represent an application software, a system software (e.g., an operating system or a device driver), or a component thereof.

In some cases, the software code can be submitted in a source code format. In some cases, the software code can be submitted by the software developer after the software code is completed. If the software code is determined to be secure, the software service platform can compile the software code into executable software code and make the executable software code available to public. The software service platform can include, or be coupled with, an app store for a user device to download the executable software code, or a software as a service (SaaS) server that provides software service using the executable software code. Alternatively, the software code can be submitted by the software developer during the development process for compiling and testing.

In some cases, the software code can include one or more OSS components. In some implementations, an OSS component can be included in the software code by including the contents, i.e., the code, of the OSS component. Alternatively or in combination, an OSS component can be included in the software code by including a functional call or a link to the OSS components. In some implementations, the software service platform can include an OSS depository that stores or links to software developed by different OSS projects. This approach enables the software service platform to incorporate the OSS components that are invoked by the software code during compiling, while reducing the size of the software code submitted by the software developer.

In some implementations, the software service platform can maintain a list of keywords that correspond to different OSS projects. The software service platform can identify an OSS component in the software code by matching the text strings the software code with these keywords. Example of the keywords can include words or a string of characters indicating one or more following characters of an OSS projects: network addresses, files paths, file names, package names, constants, logging statements, output notification (e.g., information that is displayed on a user interface). For example, the OSS projects can be APACHE, JSOUP, or GSON. The key words for these OSS projects can be character strings of "org.apache.commons.io," "orgj soup," and "com.google.code.gson," respectively. The software service platform can scan the software code from the beginning of the software code (forward scanning), from the end of the software code (backward scanning), or from both the beginning and the end of the software code (parallel scanning) to search for text strings that match the keywords.

At 204, the software service platform determines a security score for each OSS component in the software code. The security score for each OSS component is determined based on the OSS project that develops the software for the OSS component. In some cases, the security score can be the same for different OSS developed by the same OSS project based on the security assessment of the OSS project. Alternatively, the security score for different OSS developed by the same OSS project can be different, based on the security assessment of the OSS project and the security assessment of the particular OSS component that is available.

In some cases, the security assessment can be determined based on several factors. One example factor can be a Common Vulnerabilities and Exposures (CVE) score. The CVE system provides a reference-method for publicly known information-security vulnerabilities and exposures for different products. Accordingly, software developed by the OSS project can have a CVE score that indicates the level of vulnerability of the software. In some cases, the CVE score for the particular OSS component can be used. Alternatively, e.g., if the CVE score for the particular OSS component is not available, the CVE score for the OSS project can be used. In some cases, the CVE score for an OSS project can be calculated by obtaining an average of the CVE scores of software developed by the OSS project. The CVE score is published by the CVE system. In some implementations, the software service platform can query a server to obtain the CVE score of an OSS project, an OSS component, or a combination thereof.

Another example factor can be an update duration. OSS is more likely to be vulnerable to attacks if it has been released in public for a long time without being updated. The update duration can be the duration from the date that the most recent version of the OSS component is committed to the present time, the date that the most recent patch for the OSS component is released to the present time, or a combination of both.

In some cases, the update duration can be scaled based on the duration of existence of the OSS component. In one implementation, the update duration factor is calculated by dividing the update duration (e.g., in unit of days) by the existence duration (e.g., in units of days) of the OSS component. This approach provides a relative indication of the update frequency of the OSS component, which may more accurately reflect the security risk of the OSS component.

In some cases, the duration information, e.g., the release date, the patch date, and the first published date, of the OSS component are published by the OSS project that develops the OSS component. The duration information can be included in metadata, manifest, or other supplemental files that are included or associated with the OSS component. The software service platform can obtain the duration information and calculate the update duration factor.

Yet another example factor can be the development environment of the OSS component. Examples of the development environment can include the type of the software language that is used to develop the OSS component, the operating system (OS) in which the OSS component is targeted, the computing processor that is compatible with the OSS component, the hardware that is associated with the OSS component, or any combinations thereof. For example, some software languages (e.g., JAVA) include more sophisticated mechanisms of memory management, and thus are less susceptible to certain types of attack than software languages (e.g., C/C++) that do not include similar mechanisms. In some cases, information of the development environment of an OSS component can be included in the metadata, the manifest, or other supplemental files that are included or associated with the OSS component. Therefore, the software service platform can obtain the information of the development environment and assess an environmental factor accordingly.

Yet another example factor can be the complexity factor. In some cases, an OSS component can have dependencies on other OSS components. For example, an OSS component can invoke a library that is developed by another OSS project. In these cases, the security of the OSS component may depend on the other OSS components that are invoked by the OSS component. In some implementations, the complexity factor can be evaluated based on the number of other OSS components that are invoked by the OSS component to be assessed. Alternatively, the complexity factor of a particular OSS component can be evaluated based on the security scores of the OSS components that the particular OSS components depend on. For example, if an OSS component invokes multiple OSS components, the security score of the least secure OSS components that are invoked by the OSS component can be used as the complexity factor.

In some implementations, the software service platform can determine the security score of the OSS component by combining these or other factors. For example, the security score can be determined by taking an average, a weight average, a minimum, a maximum, or any other statistical measures of mathematical operations of these factors.

At 206, the software service platform can compare the security score of the OSS component with a threshold to determine whether the OSS component meets the security policy. In one example, a higher security score indicates a higher security risk. In this example, if the security score of the OSS component exceeds a configured threshold, the OSS component fails to meet the security policy. In a different example, a lower security score indicates a higher security risk. In this example, if the security score of the OSS component is below a configured threshold, the OSS component fails to meet the security policy. The threshold can be configured by an administrator of the software service platform, an enterprise associated with the software service platform, or a combination thereof.

At 208, if the software service platform determines that at least one OSS component included in the software code does not meet the security policy, the software service platform can prevent the software code from being complied. Therefore, the software service platform prevents the software code from being used by devices that are associated with the software service platform. In some cases, the method 200 can be used as part of pre-compiling check for the software code. If the software service platform does not find any OSS components in the software code, or that the OSS components in the software code meet the security policy. The software service platform can proceed to compile the software code.

In some implementations, the software code can be submitted to the software service platform from a software development device. In response, the software service platform can send a notification to the software development device. The notification can indicate the OSS components that fail to meet the security policy.

In some cases, the software service platform can maintain an OSS security databased. The OSS security database can include a list of OSS projects, components of each OSS projects, or any combinations thereof. The OSS security database can also include information, e.g., duration information, CVE scores, environmental information, or other information that can be used to calculate the security score. For some OSS components, the OSS security database can also include information of replacement OSS components that have similar functionality. The replacement OSS components can have better security scores than the corresponding OSS component. In some implementations, if the software service platform determines that an OSS component fails to meet a security policy, the software service platform can query the OSS security database to find one or more replacement OSS components, and include the information of replacement OSS components in the notification to the software development device. Alternatively or additionally, the software service platform can switch the invocation of the OSS component that does not meet security policy with a replacement OSS component. The OSS security database can be implemented as part of, or separate from, the OSS depository.

In some implementations, the software service platform can assess the security scores of the OSS components provided in the OSS depository periodically. The software service platform can remove the OSS components that do not meet the security policy from the OSS depository. The software service platform can also select the replacement OSS components based on the assessed security score, e.g., by picking the OSS components have the best score as a replacement OSS component.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the software security analyzer 122 shown in FIG. 1. The computer 302 can also be used to implement other computing devices, e.g., the OSS depository 124, the client device 102 or the software developer device 160 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising:
   scanning, by at least one hardware processor, a software code to determine whether the software code includes an open source software (OSS) component;
   for each OSS component included in the software code:
     determining, by the at least one hardware processor, a security score for the OSS component, wherein the determining comprises:
       determining an OSS project that develops the OSS component; and
       determining the security score of the OSS component based on a security assessment of the OSS project; and
     determining, by the at least one hardware processor, whether the OSS component meets a security policy by comparing the security score with a threshold; and
   in response to determining that at least one OSS component does not meet the security policy, preventing, by the at least one hardware processor, the software code including the at least one OSS component from being compiled.

2. The method of claim 1, further comprising:
   generating a notification indicating the at least one OSS component having the security score that exceeds the threshold, wherein the notification includes a suggested replacement for the at least one OSS component.

3. The method of claim 1, wherein the secure score is determined at a software service platform that includes an OSS depository.

4. The method of claim 1, wherein the security score is determined based on a Common Vulnerabilities and Exposures (CVE) score of the OSS component.

5. The method of claim 1, wherein the security score is determined based on a language type of the OSS component.

6. The method of claim 1, wherein the security score is determined based on a release date of the OSS component.

7. The method of claim 1, wherein the security score is determined based on a dependency of the OSS component on other OSS components.

8. A device, comprising:
   at least one hardware processor; and
   one or more computer-readable storage media coupled to the at least one hardware processor and storing programming instructions for execution by the at least one hardware processor, wherein the programming instructions, when executed, cause the at least one hardware processor to perform operations comprising:
      scanning, by the at least one hardware processor, a software code to determine whether the software code includes an open source software (OSS) component;
      for each OSS component included in the software code:
         determining, by the at least one hardware processor, a security score for the OSS component, wherein the determining comprises:
            determining an OSS project that develops the OSS component; and
            determining the security score of the OSS component based on a security assessment of the OSS project; and
         determining, by the at least one hardware processor, whether the OSS component meets a security policy by comparing the security score with a threshold; and
      in response to determining that at least one OSS component does not meet the security policy, preventing, by the at least one hardware processor, the software code including the at least one OSS component from being compiled.

9. The device of claim 8, the operations further comprising:
   generating a notification indicating the at least one OSS component having the security score that exceeds the threshold, wherein the notification includes a suggested replacement for the at least one OSS component.

10. The device of claim 8, wherein the secure score is determined at a software service platform that includes an OSS depository.

11. The device of claim 8, wherein the security score is determined based on a Common Vulnerabilities and Exposures (CVE) score of the OSS component.

12. The device of claim 8, wherein the security score is determined based on a language type of the OSS component.

13. The device of claim 8, wherein the security score is determined based on a release date of the OSS component.

14. The device of claim 8, wherein the security score is determined based on a dependency of the OSS component on other OSS components.

15. One or more non-transitory computer-readable media containing instructions which, when executed, cause a computing device to perform operations comprising: scanning, by at least one hardware processor, a software code to determine whether the software code includes an open source software (OSS) component;
   for each OSS component included in the software code:
      determining, by the at least one hardware processor, a security score for the OSS component, wherein the determining comprises:
         determining an OSS project that develops the OSS component; and
         determining the security score of the OSS component based on a security assessment of the OSS project; and
      determining, by the at least one hardware processor, whether the OSS component meets a security policy by comparing the security score with a threshold; and
   in response to determining that at least one OSS component does not meet the security policy, preventing, by the at least one hardware processor, the software code including the at least one OSS component from being compiled.

16. The one or more computer-readable media of claim 15, the operations further comprising:
   generating a notification indicating the at least one OSS component having the security score that exceeds the threshold, wherein the notification includes a suggested replacement for the at least one OSS component.

17. The one or more computer-readable media of claim 15, wherein the secure score is determined at a software service platform that includes an OSS depository.

18. The one or more computer-readable media of claim 15, wherein the security score is determined based on a Common Vulnerabilities and Exposures (CVE) score of the OSS component.

19. The one or more computer-readable media of claim 15, wherein the security score is determined based on a language type of the OSS component.

20. The one or more computer-readable media of claim 15, wherein the security score is determined based on a release date of the OSS component.

* * * * *